United States Patent [19]

Seebach et al.

[11] 3,887,617

[45] June 3, 1975

[54] PRODUCTION OF 2-PHENYL-3-NITROBUTYRIC ACID COMPOUNDS

[75] Inventors: Dieter Seebach, Lich; Herbert Leitz, Karlsruhe, both of Germany

[73] Assignee: Badische Anilin- & Soda-Fabrik Aktiengesellschaft, Ludwigshafen (Rhine), Germany

[22] Filed: June 26, 1972

[21] Appl. No.: 266,432

[30] Foreign Application Priority Data

July 9, 1971  Germany.............................. 2134419

[52] U.S. Cl...... 260/559 R; 260/473 R; 260/558 R; 260/558 P; 260/247.7; 260/293.8; 260/309.7; 260/326.5 E; 260/326.5 L; 260/570.5 P; 260/476 R; 260/469

[51] Int. Cl...................... C07c 103/02; C07c 67/04

[58] Field of Search .......... 260/558, 471, 515, 559, 260/473, 469, 476

[56] References Cited

OTHER PUBLICATIONS

Perekalin et al., Chem. Abst., Vol. 49, Col. 6180 g–i, (1955).

*Primary Examiner*—Harry I. Moatz
*Attorney, Agent, or Firm*—Johnston, Keil, Thompson, & Shurtleff

[57] ABSTRACT

The production of compounds of 2-phenyl-3-nitrobutyric acid by reaction of 1-phenyl-2-nitroethenes with lithium carboxamides. The compounds which can be prepared according to the process of the invention are valuable starting materials for the production of dyes and pharmaceuticals.

9 Claims, No Drawings

PRODUCTION OF 2-PHENYL-3-NITROBUTYRIC ACID COMPOUNDS

The invention relates to a process for the production of 2-phenyl-3-nitrobutyric acid compounds by reaction of 1-phenyl-2-nitroethenes with lithium carboxamides.

Angewandte Chemie, volume 81 (1969), page 1047 discloses that metallized 1,3-dithianes, for example 2-lithium-1,3-dithianes, can be added on to nitrostyrenes to form β-nitroalkylated 1,3-dithianes. It is however not possible to derive from this a general rule for adding on to nitroethenes; depending on the constitution of the nitroethene and its reactants, the reaction conditions or the catalyst used the end products, the yields of end products and the course of the reaction may be very different. Thus the basicity of the catalyst has a great influence (Houben-Weyl, "Methoden der organischen Chemie", volume X/1, page 375). Mainly polymerization of the nitroolefin takes place in the presence of a strong base. Cyclization occurs in the alkali-catalyzed adding on of ω-nitrostyrene to cyclohexanedione-(1,3) (loc. cit. page 376). In the case of the abovementioned metallic dithianes, too, the yields fluctuate between 25 and 90% of theory. Adding on takes place not only in the 2-position but also in the 1-position to the nitro group (loc. cit. page 377), for example in the case of indoles, so that the yields may fall to 9% of the theory. Moreover, the course of the reaction of the addition of organometallic compounds to nitroolefins cannot be precisely predicted (loc. ct. 417 et seq). Perekalin, "Unsaturated Nitro Compounds", Israel Program for Scientific Translations, Jerusalem 1964, page 242, shows that no clear predictions can be made concerning the reaction of malonic ester with nitroolefins; polymerization reactions may play a large part here. Substituents, for example heteroatoms, or the solvent used may stop the addition (Perekalin, loc. cit., page 246).

The object of the invention is to provide a new simple method of preparing 2-phenyl-3-nitrobutyric acid compounds in good yields and high purity.

We have found that 2-phenyl-3-nitrobutyric acid compounds of the general formula:

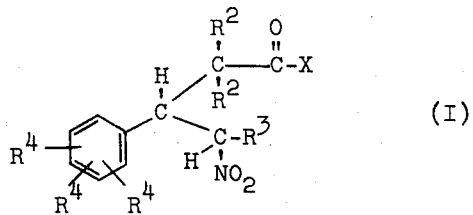

in which X may be the radical $$-N-R^1$$
$$\;\;|$$
$$\;\;R^1$$

or the radical $-OR^1$, the individual radicals $R^1$, $R^2$ and $R^4$ may be identical or different and each may be an aliphatic, araliphatic, cycloaliphatic or aromatic radical and $R^3$ is a hydrogen atom or an aliphatic radical, and each of the radicals $R^4$ may also be a hydrogen atom, a halogen atom, a nitro group, the radical $-OR^1$ where $R^1$ has the above meanings, each of the radicals $R^2$ may also be a hydrogen atom, and the two radicals $R^1$ in the radical $$-N-R^1$$
$$\;\;|$$
$$\;\;R^1$$

may also be, together with the adjacent nitrogen atom, members of a heterocyclic ring are obtained advantageously by reacting a 1-phenyl-2-nitroethene of the general formula (II):

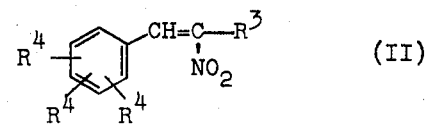

in which $R^3$ and $R^4$ have the meanings given above, with a lithium carboxamide of the general formula (III):

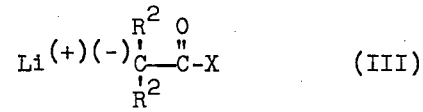

where X and $R^2$ have the meanings given above, and isolating the end product (I) from the reaction mixture in conventional manner.

When lithium N,N-diethylacetamide and 1-(2,5-dimethoxy-4-methylphenyl)-2-nitroethene are used and acetic acid is employed in the separation of the lithium, the reaction may be represented by the following equations:

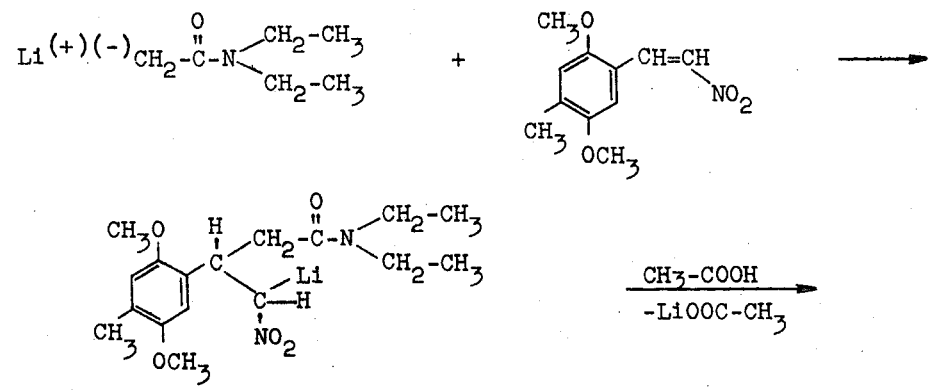

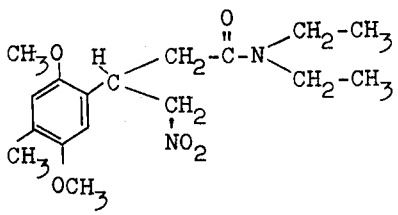

The process according to the invention gives 2-phenyl-3-nitrobutyric acid compounds in good yields and high purity in a simple way and thus affords a simple and economical method of producing tryptamine derivatives and other alkaloids. In view of the prior art it is surprising that these advantageous results could be achieved by the process according to the invention using the starting materials (III), which have not hitherto been described in their addition reactions. The influence of both the lithium cation and the carboxamido group or ester group on the reaction could not be foreseen. Surprisingly secondary reactions such as polymerization or isomerism do not play any significant part.

Starting materials (II) and (III) may be prepared by conventional methods, for example starting material (II) by reacting a ω-bromostyrene with dinitrogen tetroxide (Houben-Weyl, "Methoden der organischen Chemie", volume X/1, pages 57 et seq.) or by eliminating hydrogen halide, nitric acid or amines from appropriate compounds (Houben-Weyl, loc. cit., pages 331 to 371) or by reaction of aldehydes and nitroalkanes (J. med. Chem., volume 13 (1970), page 135).

For the production of the starting materials (III) a reaction of the lithium compound of an N,N-disubstituted amine, for example lithium diisopropylamine, with an N,N-disubstituted carboxamide, for example N,N-dimethylacetamide, in an organic solvent such as tetrahydrofuran or hexane at low temperature is also suitable as illustrated by the following equation:

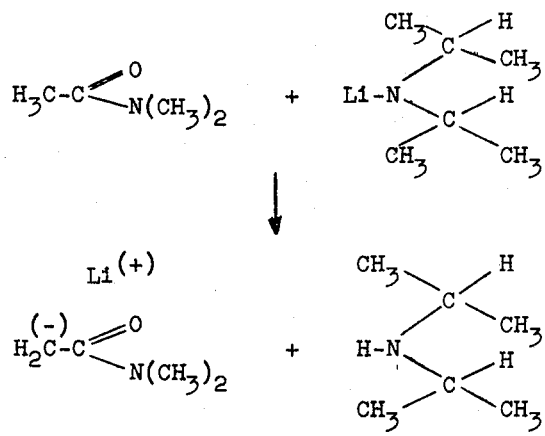

Starting materials (II) and (III) may be reacted in a stoichiometric proportion or with an excess of one starting material with reference to the other, preferably in a molar ratio of from 1 to 3 moles of starting material (III) to 1 mole of starting material (II). Preferred starting materials (II) and (III) and consequently preferred end products (I) are those in whose formulae X is the radical

or the radical $-OR^1$, the individual radicals $R^1$, $R^2$ and $R^4$ may be identical or different and each is an alkyl radical of one to six carbon atoms, a cycloalkyl radical of five to seven carbon atoms, an aralkyl radical of seven to twelve carbon atoms or a phenyl radical, and $R^3$ is hydrogen or alkyl of one to six carbon atoms, the individual radicals $R^4$ may also be hydrogen, chlorine, bromine, nitro or $-OR^1$ in which $R^1$ has the meanings given above, and the individual radicals $R^2$ may also be hydrogen, the two radicals $R^1$ in the radical

may be, together with the adjacent nitrogen atom, members of a five-membered or six-membered heterocyclic ring which may contain a further nitrogen atom or an oxygen atom. The said radicals may also bear, as substituents, groups which are inert under the reaction conditions, for example alkyl groups, alkoxy groups, each of one to four carbon atoms.

The following are examples of 1-phenylnitroethenes suitable as starting materials (II):

1-(4-chlorophenyl)-ethene, 1-(2-benzyloxyphenyl)-ethene,
1-(2,5-dimethoxyphenyl)-ethene, 1-(2-methoxy-5-chlorophenyl)-ethene,
1-(2-benzyloxy-5-chlorophenyl)-ethene,
1-(2-benzyloxy-5-bromophenyl)-ethene,
1-(2,5-dimethoxy-4-methylphenyl)-ethene,
1-(3,4,5-trimethoxyphenyl)-ethene,
1-(4-phenoxyphenyl)-ethene,
1-(4-cyclohexoxyphenyl)-ethene,
1-(4-nitrophenyl)-ethene, 1-phenyl-2-nitroethene and analogous 2-nitropropenes and 2-nitrobutenes bearing substituents in the 1-position.

Examples of suitable starting materials (III) are: the ethyl esters of acetic acid, propionic acid, butyric acid, phenylacetic acid, phenylpropionic acid, cyclohexaneacetic acid, isobutyric acid, α-methylphenylacetic acid, α-ethoxyacetic acid and the corresponding butyl, isobutyl, methyl, cyclohexyl, benzyl and phenyl esters; analogous N,N-dimethylamides, N-methyl-N-benzylamides, N,N-diethylamides, N,N-di-n-propylamides, N,N-diisobutylamides, N,N-diphenylamides, N-methyl-N-cyclohexylamides and N,N-dibenzylamides and the corresponding piperidides, morpholides, pyrrolidides and imidazolidides of the abovementioned carboxylic acids.

The reaction is carried out as a rule at a temperature of from $-120°$ to $+25°C$, preferably at from $-100°$ to $-50°C$, at atmospheric or superatmospheric pressure, continuously or batchwise. An organic solvent which is inert under reaction conditions such as a cyclic ether, for example dioxane or tetrahydrofuran; an aliphatic hydrocarbon, for example hexane, petroleum ether or ligroin; a dialkyl ether of an alkylene glycol, for example dimethylethylene glycol, dimethyldiethylene glycol, dimethyltriethylene glycol, formaldehyde dimethylacetal and appropriate mixtures of the same is generally used. Advantageous amounts are from 800 to 3000% by weight of solvent based on starting material (II).

The reaction may be carried out as follows: a mixture of the starting materials, generally with a solvent, is kept at the reaction temperature for from one hour to four hours while mixing well. The starting material (III) is advantageously placed in the reactor and starting material (II) added slowly. In many cases the reaction is carried out in an atmosphere devoid of oxygen, for example under nitrogen or a rare gas such as argon. The reaction mixture contains the end product in the form of its lithium compound and the end product is isolated therefrom by a conventional method, for example by adding advantageously the stoichiometric amount of acid to the mixture, if necessary followed by heating, adding water, separating the organic solvent and filtering. Instead of acids, for example hydrochloric acid, sulfuric acid, phosphoric acid or organic acids such as acetic acid, it is also possible to use acid salts, for example sodium bicarbonate, $NaH_2PO_4$, $Na_2HPO_4$ and other appropriate proton donors.

psilocin which are of interest for psychiatry (Hofmann, "Psychotomimetic Agents", A. Burger, "Chemical Constitution and Pharmacodynamic Action", volume II (Dekker, N.Y. 1968), pages 186 to 197, 221 and 222). The synthetic methods hitherto known (J. chem. Soc. 1954, 1165; R. W. Hoffmann, "Dehydrobenzenes and Cycloalkynes" (Verlag Chemie, Weinheim 1967), pages 156, 157; Bull. Soc. chim. Fr. 1966, 1335) for these 1,4-diaminobutanes and consequently for these alkaloids are considerably simplified by the process according to the invention. The following equations illustrate the principle of this method of synthesis using lithium N,N-dimethylacetamide as an example:

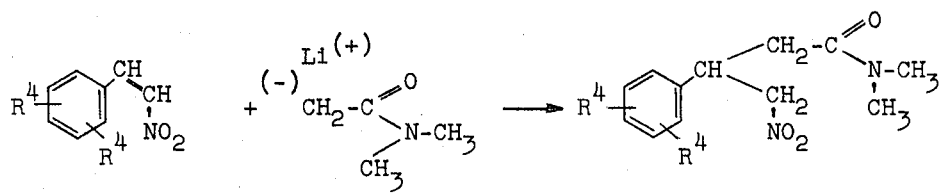

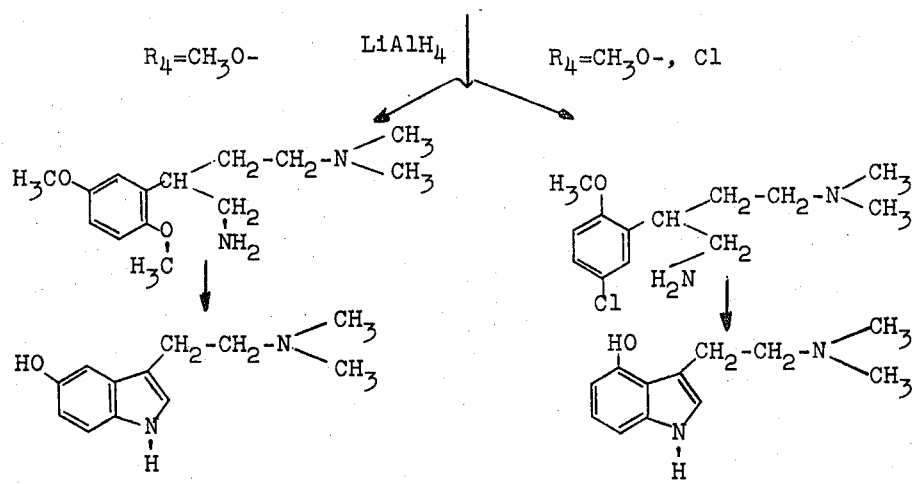

In an advantageous embodiment of the process the starting material (III) is prepared by a known method and the reaction mixture thus formed is used without separation of the starting material (III) direct for the process according to the invention. For example the lithium compound of a N,N-disubstituted amine is reacted for twelve minutes to two hours at the said reaction temperature in one of the abovementioned solvents, for example a mixture of tetrahydrofuran and hexane, with an appropriate N,N-disubstituted carboxamide, the starting material (II) is added in portions to the reaction mixture thus formed, with or without an organic solvent, and the process according to the invention is then carried out in the manner described.

The compounds which can be prepared according to the process of the invention are valuable starting materials for the production of dyes and pharmaceuticals. For example they can be converted by hydrogenation, conveniently with lithium aluminum hydride, into the corresponding 1,4-diaminobutanes bearing substituents in the 2-, 3-and 4-positions, and these are precursors of for example the hallucinogens bufotenine and The corresponding γ-aminobutyric acids may be obtained from the end products (I) obtained in the form of esters and the acids may be converted for example by hydrogenation into the corresponding substituted pyrrolidones. Reference is made to Chemical Abstracts, volume 66, 17916 concerning the effectiveness of γ-aminobutyric acids against spasms and convulsions. The abovementioned methods of synthesis to tryptamine derivatives are thus also further methods of synthesis to pharmacologically interesting indole compounds (Sundberg, "The Chemistry of Indoles" (Academic Press N.Y. 1970); particularly pages 431 et seq.).

The following Examples illustrate the invention. The parts given in the following Examples are parts by weight, unless stated otherwise. The parts by weight bear the same relation to parts by volume as the kilogram to the liter.

EXAMPLE 1

β-(2'-benzyloxyphenyl)-γ-nitrobutyric acid N,N-dimethylamide 6.5 parts of N,N-dimethylacetamide is added at −78°C under argon to a solution of 7.75 parts of lithium diisobutylamine in 100 parts by volume of tetrahydrofuran and 25 parts by volume of hexane. One hour later 12.75 parts of 1-(2'-benzyloxyphenyl)-2-nitroethene dissolved in 100 parts by volume of tetrahydrofuran is added slowly within 50 minutes and with vigorous stirring, stirring is continued for two hours at −78°C and then 15 parts by volume of glacial acetic acid is added at this temperature. After the colorless solution has been heated to 20°C and 60 parts by volume of water has been added, the solvent is removed in a rotational evaporator. The crystalline end product is suction filtered from the residue, washed with water and dried. The yield is: 16.9 parts (99% of theory); melting point 90.1° to 92.0°C.

EXAMPLES 2 to 9

In the manner described in Example 1 the following amounts of starting material (II) (with $R^3$ being hydrogen) are reacted. The substituents in the 1-position in the 2-nitroethenes are indicated in the Table by giving the phenyl substituents. All the other reaction conditions and the production and amounts of starting material (III) are the same as in Example 1. The end products (I) are corresponding γ-nitrobutyric acid N,N-dimethylamides which are substituted in the β-position in the way mentioned.

TABLE 1

(Abbreviations: Ex. = Example No.
(II) = parts of starting material (II)
(I) = parts of end product (I)
Yld. = Yield in % of theory
M. pt. = melting point in °C)

| Ex | 1-position substituent | (II) | (I) | Yld. | M. pt. |
|---|---|---|---|---|---|
| 2 | 1-(4-chlorophenyl)- | 100 | 134 | 94 | 94.4 to 95.3 |
| 3 | 1-(2-benzyloxyphenyl)- | 100 | 133 | 99 | 92.8 to 94.0 |
| 4 | 1-(2,5-dimethoxyphenyl)- | 100 | 137 | 97 | 106.4 to 107.8 |
| 5 | 1-(2-methoxy-5-chlorophenyl)- | 100 | 138 | 98 | 118.0 to 119.0 |
| 6 | 1-(2-benzyloxy-5-chlorophenyl)- | 100 | 128 | 98 | 99.4 to 100.4 |
| 7 | 1-(2-benzyloxy-5-bromophenyl)- | 100 | 114 | 90 | 105.0 to 106.2 |
| 8 | 1-(2,5-dimethoxy-4-methylphenyl)- | 100 | 132 | 95 | 124.6 to 126.0 |
| 9 | 1-(3,4,5-trimethoxyphenyl)- | 100 | 106 | 78 | 109.0 to 110.3 |

EXAMPLE 10

The reaction is carried out analogously to Example 1 with other starting materials (II) and (III) whose radicals $X$, $R^2$, $R^3$ and $R^4$ are set out in the following Table 2. Analogously to Example 1, starting material (II) is reacted direct with starting material (III) without separation from the reaction mixture obtained in its production. Lithium diisobutylamine and N,N-dimethylacetamide serve as components in the production of starting material (III).

TABLE 2

| Example | 10 |
|---|---|
| $R^4$ | 2,5-dimethoxy-4-methyl- |
| $R^2$ | H |
| $R^3$ | $CH_3$ |
| X | $N(CH_3)_2$ |
| Parts of starting material (III) | 92 |
| Parts of starting material (II) | 100 |
| Parts of end product (I) | 92 |
| Yield in % of theory | 71 |
| Melting point in °C | 75 to 85 |

EXAMPLE 11

2.2 parts of ethyl acetate is added under argon at −78°C to a solution of 2.7 parts of lithium diisobutylamine. The whole is allowed to react at −78°C for 1 hour.

2.39 parts of 1-(3,4,5-trimethoxyphenyl)-2-nitroethene dissolved in 30 parts by volume of tetrahydrofuran is added within thirty minutes while mixing well. After another hour at −78°C 5 parts by volume of glacial acetic acid is added and then the solvent is removed in a rotational evaporator. 30 parts by volume of water is poured onto the remaining oily product. The end product is crystallized, suction filtered and washed four times, each time with 10 parts by volume of water. The yield is 3.16 parts (94% of theory) of 4-nitro-3-(3,4,5-trimethoxyphenyl)-butyric acid ethyl ester. The melting point of the product is 89.9° to 92°C after recrystallization from a mixture of benzene and cyclohexane.

EXAMPLE 12

2.30 parts of N,N-diethylacetamide is added under argon at −78°C to a solution of 2.02 parts of lithium diisobutylamine. The temperature is allowed to rise within 30 minutes to −50°C and the whole is then cooled to −78°C again.

While mixing well, 2.23 parts of 1-(2,5-dimethoxy-4-methylphenyl)-2-nitroethene dissolved in 25 parts by volume of tetrahydrofuran is added over thirty minutes. The mixture becomes colorless. The mixture is stirred for another 30 minutes at −78°C. 4 parts by volume of glacial acetic acid and 10 parts by volume of water is added and the solvent is removed in a rotational evaporator at a bath temperature of 30°C. The crude product crystallizes out almost colorless. It is suction filtered and washed four times with 10 parts by volume of water. 2.88 parts of 4-nitro-3-(2,5-dimethoxy-4-methylphenyl)-butyric acid N,N-diethylamide (85% of theory) is obtained. Melting point: 76.4° to 77.6°C after recrystallization from a mixture of ethanol and pentane.

EXAMPLE 13

5.0 parts of N,N-dimethylpropionamide is added under argon at −78°C to a solution of 5.4 parts of lithium diisobutylamine. The whole is allowed to heat up to −50°C within 30 minutes and is then cooled again to −78°C. While mixing well 5.1 parts of 1-(2-benzyloxyphenyl)-2-nitroethene, dissolved in 30 parts by volume of tetrahydrofuran, is added within 30 minutes. After further stirring at −78°C, 8 parts by volume of glacial acetic acid and 20 parts by volume of water are added after 2 hours. The solvent is removed in a rotational evaporator. The residue is extracted with methylene chloride and the organic phase is washed three times with water and dried over sodium sulfate. After the solvent has been removed, an oil remains which crystallizes after an hour. 5.975 parts of 4-nitro-3-(2-benzyloxyphenyl)-2-methylbutyric acid N,N-dimethylamide (85.5% of theory) is obtained. The melting point is 83° to 101°C after recrystallization from a mixture of ethanol and pentane.

We claim:
1. A process for the production of a 2-phenyl-3-nitrobutyric acid compound of the formula:

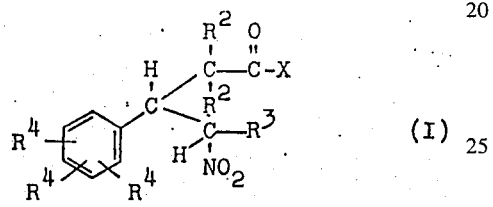

in which X is the radical

or the radical —OR¹, the individual radicals R¹, R² and R⁴ may be identical or different and each may be an aliphatic, araliphatic, cycloaliphatic or aromatic radical, R³ is hydrogen or an aliphatic radical, and each of the radicals R⁴ may also be hydrogen, halogen, nitro, or —OR¹ in which R¹ has the meanings given above, each of the radicals R² may also be hydrogen, and the two radicals R¹ in the radical

may also form together with the adjacent nitrogen atom a heterocyclic ring, wherein a 1-phenyl-2-nitroethene of the formula:

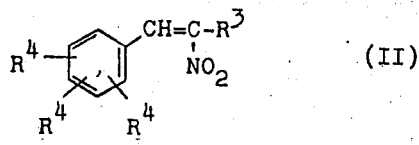

in which R³ and R⁴ have the meanings given above is reacted at a temperature within the range from −120° to +25°C with a lithium compound of the formula:

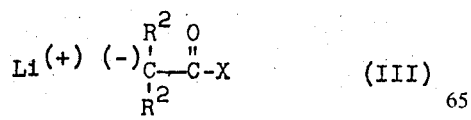

in which X and R² have the meanings given above, an acid or a proton-donating acid salt is added to the reaction mixture in an amount sufficient to convert the end product (I) in the form of its lithium compound to said end product (I), and the end product (I) is isolated from the reaction mixture.

2. A process as claimed in claim 1 wherein the reaction is carried out with a ratio of 1 to 3 moles of starting material (III) to 1 mole of starting material (II).

3. A process as claimed in claim 1 wherein the reaction is carried out at a temperature within the range of from −100° to −50°C.

4. A process as claimed in claim 1 wherein the reaction is carried out in an organic solvent which is inert under the reaction conditions.

5. A process as claimed in claim 1 wherein X is

in which each R¹ has the meanings given above.

6. A process as claimed in claim 1 wherein X is —OR¹ in which R¹ has the meanings given above.

7. A process as claimed in claim 1 in which X is

in which the individual radicals R¹, R² and R⁴ may be identical or different and each is an alkyl radical of one to six carbon atoms, a cycloalkyl radical of five to seven carbon atoms, an aralkyl radical of seven to twelve carbon atoms or a phenyl radical, and R³ is hydrogen or alkyl of one to six carbon atoms, the individual radicals R⁴ may also be hydrogen, chlorine, bromine, nitro or —OR¹ in which R¹ has the meanings given above, and the individual radicals R² may also be hydrogen or any of the aforesaid radicals bearing, as substituents, alkyl groups or alkoxy group respectively having one to four carbon atoms.

8. A process as claimed in claim 1 in which X is

wherein the two radicals R¹, together with their adjacent nitrogen atom, form a 5-membered or 6-membered heterocyclic ring which may contain a further nitrogen atom or an oxygen atom.

9. A process as claimed in claim 1 wherein β-(2'-benzyloxyphenyl)-γ-nitrobutyric acid N,N-dimethylamide is prepared by the reaction in an inert organic solvent at −120° to +25°C of 1-(2'-benzyloxyphenyl)-2-nitroethene as the reactant (II) and a lithium carboxamide of the formula

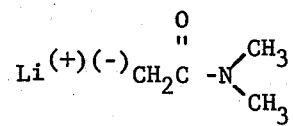

as the reactant (III) at a mol ratio of 1:1-3 of (II) to (III).

* * * * *